(12) United States Patent
Hasegawa et al.

(10) Patent No.: US 9,222,695 B2
(45) Date of Patent: Dec. 29, 2015

(54) HEAT EXCHANGE VENTILATOR

(75) Inventors: Norihiko Hasegawa, Aichi (JP);
Hirotsugu Hirano, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1241 days.

(21) Appl. No.: 12/599,727

(22) PCT Filed: May 14, 2008

(86) PCT No.: PCT/JP2008/001200
§ 371 (c)(1),
(2), (4) Date: Nov. 11, 2009

(87) PCT Pub. No.: WO2008/142851
PCT Pub. Date: Nov. 27, 2008

(65) Prior Publication Data
US 2011/0189937 A1    Aug. 4, 2011

(30) Foreign Application Priority Data

May 15, 2007    (JP) .................................. 2007-128944

(51) Int. Cl.
*F24H 3/10* (2006.01)
*F24F 12/00* (2006.01)
(Continued)

(52) U.S. Cl.
CPC ............. *F24F 12/006* (2013.01); *F28D 9/0093* (2013.01); *F28D 9/02* (2013.01); *F28D 21/0014* (2013.01); *F28F 17/00* (2013.01); *F28F 2270/00* (2013.01); *Y02B 30/563* (2013.01)

(58) Field of Classification Search
CPC .... F24F 2/006; F24F 12/0006; Y02B 30/563; F28D 9/0093; F28D 9/02; F28D 21/0014; F28D 9/093; F28F 2270/00; F28F 17/00

USPC ............ 454/239; 165/54, 122, 166, 231, 233, 165/53, 135
See application file for complete search history.

(56) References Cited

U.S. PATENT DOCUMENTS 3,980,129 A * 9/1976 Bergdahl ....................... 165/233
4,105,064 A * 8/1978 Del Toro et al. .............. 165/233
(Continued)

FOREIGN PATENT DOCUMENTS

JP    57037692    *  3/1982  ................ F28D 9/00
JP    61-186749       8/1986
(Continued)

OTHER PUBLICATIONS

STIC search.pdf.*
(Continued)

*Primary Examiner* — Steven B McAllister
*Assistant Examiner* — Frances F Hamilton
(74) *Attorney, Agent, or Firm* — RatnerPrestia

(57) ABSTRACT

A heat exchange ventilator includes a plurality of heat exchanger elements provided with a heat-exchanger exhaust airflow path and a heat-exchanger intake airflow path. Exhaust airflow and intake airflow are guided to pass through one of the plurality of heat exchanger elements, and the exhaust airflow and the intake airflow are switched to the next heat exchanger element in a sequential order when a state of the heat exchanger element comes to a predetermined condition set based on adverse influences of ice formation inside a heat-exchanger exhaust airflow path. The structure prevents the heat exchanger element from icing to avoid the adverse influences, thereby making it capable of exerting the fundamental heat exchanging and ventilating function continuously.

20 Claims, 9 Drawing Sheets

(51) Int. Cl.
  *F28F 17/00* (2006.01)
  *F28D 9/02* (2006.01)
  *F28D 9/00* (2006.01)
  *F28D 21/00* (2006.01)

(56) References Cited

U.S. PATENT DOCUMENTS

| | | | | |
|---|---|---|---|---|
| 4,228,849 | A * | 10/1980 | Heinola | 165/286 |
| 4,244,422 | A * | 1/1981 | Hallgren | 165/101 |
| 4,653,574 | A * | 3/1987 | Quinlisk et al. | 165/54 |
| 4,745,629 | A * | 5/1988 | Essig et al. | 377/20 |
| 5,085,037 | A * | 2/1992 | Scott-Scott | 60/39.093 |
| 5,119,987 | A * | 6/1992 | Kobayashi | 236/49.3 |
| 5,193,610 | A * | 3/1993 | Morissette et al. | 165/54 |
| 5,257,736 | A * | 11/1993 | Roy | 236/49.3 |
| 5,431,215 | A * | 7/1995 | Davis | 165/11.1 |
| 5,490,557 | A * | 2/1996 | Taylor | 165/54 |
| 5,497,823 | A * | 3/1996 | Davis | 165/231 |
| 5,632,334 | A * | 5/1997 | Grinbergs et al. | 165/232 |
| 5,829,513 | A * | 11/1998 | Urch | 165/54 |
| 6,176,305 | B1 * | 1/2001 | Haglid | 165/231 |
| 6,257,230 | B1 * | 7/2001 | Barudi et al. | 126/512 |
| 6,626,237 | B2 * | 9/2003 | Bergman | 165/232 |
| 6,983,794 | B2 * | 1/2006 | Fujimoto | 165/231 |
| 7,024,878 | B2 * | 4/2006 | Trulaske, Sr. | 62/298 |
| 7,231,967 | B2 * | 6/2007 | Haglid | 165/231 |
| 7,409,986 | B2 * | 8/2008 | Lee et al. | 165/267 |
| 7,467,522 | B2 * | 12/2008 | Tanaka | 62/186 |
| 7,565,924 | B2 * | 7/2009 | Gagnon et al. | 165/54 |
| 7,594,539 | B2 * | 9/2009 | Isaka | 165/248 |
| 7,837,127 | B2 * | 11/2010 | Kristinsson et al. | 236/49.3 |
| 8,382,565 | B2 * | 2/2013 | Dawson et al. | 454/239 |
| 8,418,484 | B2 * | 4/2013 | Petrenko et al. | 62/151 |
| 2002/0153133 | A1 * | 10/2002 | Haglid | 165/231 |
| 2007/0169927 | A1 | 7/2007 | Isaka | |
| 2009/0242185 | A1 * | 10/2009 | Haseldine, Jr. | 165/231 |
| 2010/0167636 | A1 * | 7/2010 | Bhattacharya et al. | 454/239 |
| 2011/0230131 | A1 * | 9/2011 | Gao et al. | 454/239 |

FOREIGN PATENT DOCUMENTS

| | | | | |
|---|---|---|---|---|
| JP | 61186749 A | * | 8/1986 | F24F 7/08 |
| JP | 62-299644 A | | 12/1987 | |
| JP | 04-281138 A | | 10/1992 | |
| JP | 09-287794 A | | 11/1997 | |
| JP | 2000-283517 A | | 10/2000 | |
| JP | 2000-283517 A | | 10/2000 | |
| JP | 2001-174021 A | | 6/2001 | |
| JP | 2001-174021 A | | 6/2001 | |
| JP | 2003-232539 A | | 8/2003 | |
| JP | 2003-232539 A | | 8/2003 | |
| JP | 2005-233494 A | | 9/2005 | |
| JP | 2005-291617 | * | 10/2005 | F24F 3/147 |
| JP | 2005-291617 A | | 10/2005 | |
| JP | 2006-207940 A | | 8/2006 | |

OTHER PUBLICATIONS

STIC NPL search .pdf.*
Kragh et al., "New counter flow heat exchanger designed for ventilation systems in cold climates," ScienceDirect, Energy and Buildings, 39 (2007) pp. 1151-1158.
Air-Conditioning & Refrigeration Institute, 2005 Guideline for Selecting, Sizing, & Specifying Packaged Air-To-Air Energy Recovery Ventilation Equipment, ARI Guideline W-2005 (Section 5.1.4.4).
Kragh, et al., "Mechanical Ventilation with Heat Recovery in Cold Climates," pp. 5-7, points 3-5.
Venmar Ventilation Inc., "Applied Product Data Manual for EnergyPack@ and CustomPack@ Units," Nov. 2002 (7.2F. pp. 33-34).
Venmar Ventilation Inc., "Product Data Manual for Roofpack H Series 3000—10000 CFM, Outdoor and Indoor Installation," Nov. 1996 (p. 21).
International Search Report for International Application No. PCT/JP2008/001200, Aug. 5, 2008, Panasonic Corporation.

* cited by examiner

HEAT EXCHANGE VENTILATOR

This Application is a U.S. National Phase Application of PCT International Application PCT/JP2008/001200.

TECHNICAL FIELD

The present invention relates to heat-exchanger type ventilation systems used especially in cold climate and similar areas for exchanging heat between flow of air being exhausted from indoors to outdoors and another flow of air being taken from outdoors to indoors.

BACKGROUND ART

A heat-exchanger type ventilation system of certain kind starts icing and clogging up inside an airflow path in the heat exchanger where warm exhaust air flows from the indoors due to the influence of cold air being taken from outdoors in the adjoining airflow path, when an outdoor temperature becomes as low a temperature as −10° C. in winter season. Conventional heat-exchanger type ventilation systems generally use a structure equipped with means to block cold air to prevent clogging due to ice formation as disclosed in patent literature 1, for example. However, the reality has been that there are no heat-exchanger type ventilation systems practically serviceable in regions where outdoor temperatures became as low as −25° C.

Referring now to FIG. 15 to FIG. 17, description is provided hereafter of a heat-exchanger type ventilation system shown in patent literature 1. FIG. 15 is a sectional view of the conventional heat-exchanger type ventilation system showing a state of heat-exchanging operation. As shown in FIG. 15, the conventional heat-exchanger type ventilation system comprises main body 105 provided therein with motor 103 having air-exhaust fan 101 and air-intake fan 102 fixed thereto, and heat exchanger 104. The ventilation system further comprises exhaust airflow path 107 for guiding exhaust airflow 113 from exhaust port 106 opened in an indoor room to the outdoors, and intake airflow path 109 for guiding intake airflow 112 from the outdoors into the room through intake port 108, wherein exhaust airflow path 107 and intake airflow path 109 are formed to intersect with each other inside heat exchanger 104. There are also damper 110 disposed inside intake airflow path 109 at the upstream of heat exchanger 104 for blocking or not blocking intake airflow 112, and intake-air temperature detector 111 for detecting a temperature of the outdoor air taken inside main body 105.

FIG. 16 is a sectional view of the same heat-exchanger type ventilation system showing another mode of operation when the intake airflow is blocked. When intake-air temperature detector 111 detects a predetermined temperature set as a value just before freezing, or −3° C. for instance, damper 110 closes intake airflow path 109 completely to block intake airflow 112, as shown in FIG. 16, thereby allowing the ventilation system to operate only with exhaust airflow 113 to avoid icing. When the air temperature surrounding intake-air temperature detector 111 rises to a predetermined set value in the course of continuing the operation of exhausting only the warm indoor air, damper 110 opens intake airflow path 109 and makes the ventilation system to resume the heat exchanging operation.

FIG. 17 is a sectional view of the same heat-exchanger type ventilation system showing still another mode of operation, in which a part of the exhaust air is circulated while the intake airflow is being blocked. As a different mode from that of FIG. 16, a part of warm exhaust airflow 113 is diverted into intake airflow path 109 and let it pass through heat-exchanger intake airflow path 109a inside heat exchanger 104, as shown in FIG. 17 while damper 110 keeps blocking intake airflow 112, and to have this exhaust airflow 113 help melt ice if built-up.

As described, the conventional heat-exchanger type ventilation system operates only in the exhausting mode when intake airflow path 109 is blocked to prevent heat exchanger 104 from icing, such that it does not carry out the primary function of ventilating air while exchanging heat between the indoor air and the outdoor air at the same time. The conventional heat-exchanger type ventilation system also has a drawback that it produces a negative pressure in the room when it only vents the air through exhaust airflow path 107, which often causes cold drafts and dew condensation due to the air entering from outdoors through spaces in the building.
Patent Literature 1: Japanese Patent Unexamined Publication, No. 2005-233494

SUMMARY OF THE INVENTION

A heat-exchanger type ventilation system of the present invention is a kind of ventilation system comprising a heat exchanger for allowing exhaust airflow to move from inside a room to outdoors and intake airflow to move from the outdoors to the room, and exchanging heat between the exhaust airflow and the intake airflow. The heat exchanger of the present invention includes a plurality of separate heat exchanger elements, each having a heat-exchanger exhaust airflow path and a heat-exchanger intake airflow path formed therein for allowing the exhaust airflow and the intake airflow to pass through. This heat-exchanger type ventilation system is so constructed that the exhaust airflow and the intake airflow are guided through one heat exchanger element among the plurality of them, and passages of the exhaust airflow and the intake airflow are switched from the one heat exchanger element to another in a sequential manner according to a predetermined condition set based on adverse influences of ice formation inside the heat-exchanger exhaust airflow path.

The heat exchanger of the present invention has the plurality of separate heat exchanger elements, and the exhaust airflow and the intake airflow are allowed to pass through only one of these heat exchanger elements. When ice starts building up along the heat-exchanger exhaust airflow path inside the heat exchanger element due to extremely low outdoor temperatures, an influence of the ice formation is detected, and the passages of the exhaust airflow and the intake airflow are switched to another heat exchanger element in order to continue the fundamental heat exchanging and ventilating operation. This structure can hence maintain the same normal heat exchanging and ventilating operation continuously thereafter even when the airflows are switched back to the original heat exchanger element that has been iced up previously since it has been given a sufficient time for deicing and drying. The structure can also ensure accurate detection of the icing condition to avoid adverse influences of the ice formation. Furthermore, this heat-exchanger type ventilation system can achieve a comfortable living space without producing a cold draft and dew condensation since it can maintain a good balance between the exhaust air and the intake air in the room.

Figure 1:
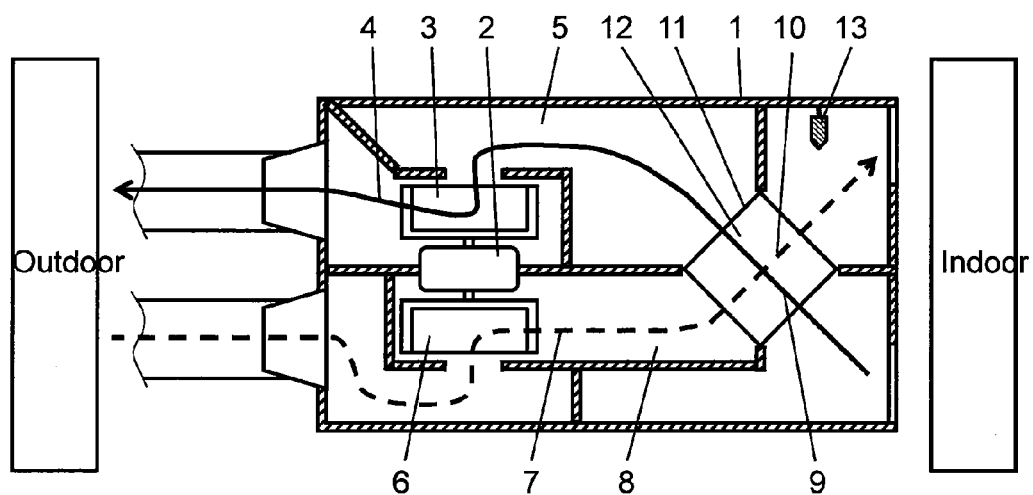
FIG. 1 is a sectional view showing a heat-exchanger type ventilation system according to a first exemplary embodiment of the present invention.

REFERENCE MARKS IN THE DRAWINGS 4, 4a, 4b, 4c, 4d and 4e Exhaust airflow
4f, 4g, 4h, 4i and 4j Indoor-air circulation flow
4k, 4l, 4m, 4n and 4o Indoor-air circulation flow
4p, 4q, 4r, 4s and 4t Indoor-air circulation flow
7 Intake airflow
9, 9a, 9b, 9c, 9d and 9e Heat-exchanger exhaust airflow path
10, 10a, 10b, 10c, 10d and 10e Heat-exchanger intake airflow path
11 Heat exchanger
12, 12a, 12b, 12c, 12d and 12e Heat exchanger element
13 Intake-air temperature detector
14 Outdoor temperature detector
15 Indoor temperature detector
16 Indoor humidity detector
17 Exhaust-air temperature detector
18 Air velocity detector
19 Static pressure detector

DETAILED DESCRIPTION OF PREFERRED EMBODIMENTS

First Exemplary Embodiment

FIG. 1 is a sectional view showing a heat-exchanger type ventilation system according to the first exemplary embodiment of the present invention. As shown in FIG. 1, this heat-exchanger type ventilation system comprises box-shaped main body 1 provided therein with exhaust airflow path 5 for guiding exhaust airflow 4 and expelling air in a room to outdoors with exhaust fan 3 fixed to a rotor shaft of electric motor 2, and intake airflow path 8 for guiding intake airflow 7 and drawing outdoor air into the room with intake fan 6 also fixed to the rotor shaft of electric motor 2, wherein exhaust airflow 4 and intake airflow 7 are so guided as to intersect with each other in one space. Heat-exchanger exhaust airflow path 9 and heat-exchanger intake airflow path 10 are formed in this intersecting space to allow exhaust airflow 4 and intake airflow 7 to pass therethrough. Heat exchanger 11 comprises a plurality of heat exchanger elements 12 so formed that both heat-exchanger exhaust airflow path 9 and heat-exchanger intake airflow path 10 are divided into a plurality of airflow paths. In this first exemplary embodiment, the plurality of heat exchanger elements 12 are stacked in a direction perpendicular to the plane of FIG. 1, or so arranged that they overlap one another in a plan view.

Figure 2A:
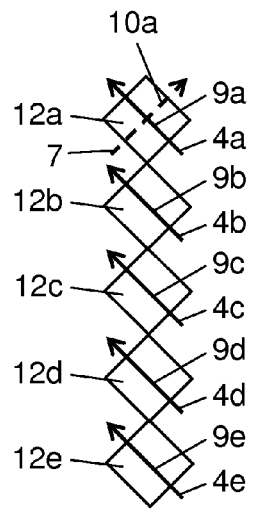
FIG. 2A is structural diagram showing a method of guiding exhaust airflow and intake airflow in the heat-exchanger type ventilation system according to the first exemplary embodiment of the present invention.
Figure 2B:
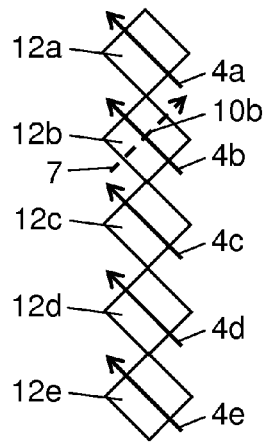
FIG. 2B is another structural diagram showing the method of guiding the exhaust airflow and the intake airflow in the heat-exchanger type ventilation system according to the first exemplary embodiment of the present invention.
Figure 2C:
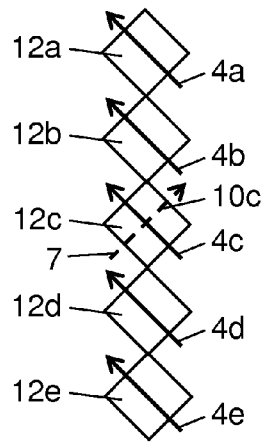
FIG. 2C is still another structural diagram showing the method of guiding the exhaust airflow and the intake airflow in the heat-exchanger type ventilation system according to the first exemplary embodiment of the present invention.

Description is provided hereinafter of the heat-exchanger type ventilation system constructed as above when operated in winter in an area of cold climate. FIGS. 2A, 2B and 2C are structural diagrams showing the plurality of heat exchanger elements 12 arranged longitudinally into one row instead of their actual overlapping configuration for the sake of convenience in understanding the method of guiding exhaust airflow 4 and intake airflow 7 into these heat exchanger elements 12.

Heat exchanger 11 comprises five (5) heat exchanger elements denoted 12a, 12b, 12c, 12d and 12e, as shown in FIG. 2A. Exhaust airflow 4 for expelling the air in the room to outdoors is divided into airflows 4a, 4b, 4c, 4d and 4e, and allowed to pass through all heat-exchanger exhaust airflow paths 9a, 9b, 9c, 9d and 9e in respective heat exchanger elements 12a, 12b, 12c, 12d and 12e. On the other hand, intake airflow 7 is guided to pass only through intake airflow path 10a in one heat exchanger element 12a. The operation thus begins in this mode. That is, at the beginning of the operation, exhaust airflow 4a and intake airflow 7 are guided to pass through only one heat exchanger element 12a out of the five elements where the heat is exchanged between exhaust airflow 4a and intake airflow 7, whereas the other four heat exchanger elements 12b, 12c, 12d and 12e receive only exhaust airflows 4b, 4c, 4d and 4e respectively.

After the operation begins, intake-air temperature detector 13 disposed inside intake airflow path 8 at the downstream of heat-exchanger intake airflow path 10 detects a temperature of intake airflow 7. When the operation continues and the heat being exchanged in heat exchanger element 12a while the outdoor temperature stays so low as below 0° C., intake airflow 7 of the cold temperature gradually develops dew condensation and ice being formed inside heat-exchanger exhaust airflow path 9a where warm exhaust airflow 4 keeps passing through it. When ice starts building up, it slowly lessens the heat exchanging efficiency, decreases a transferring rate of the heat from exhaust airflow 4a to intake airflow 7, and gradually lowers the temperature of intake airflow 7 that passes through heat-exchanger intake airflow path 10a. In consideration of intake airflow 7 of such low temperatures, this ventilation system is provided with a temperature value preset beforehand and designated as icing temperature F (° C.), of which air, if continue to flow, is likely to develop an icing condition leading to a problem in the heat exchanging function of heat exchanger 11. When intake-air temperature detector 13 detects this preset icing temperature F (° C.), intake airflow 7 is switched from heat exchanger element 12a, where exhaust airflow 4a has been passing through, to heat exchanger element 12b located next to it. FIG. 2B shows the intake airflow and the exhaust airflow after they are switched to heat exchanger element 12b. Since heat exchanger element 12b is in the normal condition because of the warm exhaust airflow 4b passing through heat-exchanger exhaust airflow path 9b, it can continue the fundamental heat exchanging and ventilating function. Intake-air temperature detector 13 now detects a temperature of intake airflow 7, the heat of which has been exchanged normally in heat exchanger element 12b, and the detected temperature therefore becomes higher than the icing temperature F (° C.). The normal heat exchanging and ventilating operation is hence continued in heat exchanger element 12b.

When the operation is continued further, icing again develops gradually inside heat-exchanger exhaust airflow path 9b. The same process is thus repeated to switch intake airflow 7 to the next heat exchanger element 12c where intake airflow 7 and exhaust airflow 4c pass through. FIG. 2C shows the intake airflow and the exhaust airflow after they are switched to heat exchanger element 12c. The same process is repeated thereafter to switch intake airflow 7 of heat exchanger element 12 to heat exchanger element 12d and the next heat exchanger element 12e in a sequential manner.

When the switching process comes back again from heat exchanger element 12e to heat exchanger element 12a after one complete round, heat exchanger element 12a becomes free of the ice formed previously and dried by the warm exhaust airflow 4a passing through it to resumes its normal condition. The normal heat exchanging and ventilating operation can be thus continued further without an interruption.

Heat exchanger 11 of the above structure may be composed integrally with thermal insulation materials placed individually between adjoining heat exchanger elements 12, although not shown in the accompanying drawings, so that it can be made compact in a dimension of the stacked direction since this structure can prevent the cold temperature of heat exchanger element 12 previously carrying intake airflow 7 from influencing upon the adjoining heat exchanger elements 12 after exhaust airflow 4 and intake airflow 7 have been switched, Although what has been discussed above is an example of the operation, in which passages of exhaust airflow 4 and intake airflow 7 are switched sequentially to the adjoining heat exchanger element 12, they may be switched to every second or third heat exchanger element 12. The thermal insulation materials mentioned above become unnecessary when operated in this manner.

According to the first exemplary embodiment of this invention, as discussed, the heat-exchanger type ventilation system is capable of continuing the ventilating operation while maintaining the fundamental heat exchanging function even when operated in winter in an area of cold climate where the outdoor temperature is extremely low, and it thereby achieves a comfortable living space in the cold climate.

The heat-exchanger type ventilation system becomes more desirable one when entire volumes of exhaust airflow 4 and intake airflow 7 are well balanced by adjusting a volume of exhaust airflow 4 that passes through heat exchanger elements 12 not contributing to the heat exchanging operation.

Second Exemplary Embodiment

FIG. 2A, et al. referred to in the first exemplary embodiment illustrate the plurality of heat exchanger elements 12a, 12b, 12c, 12d and 12e arranged in a plane figure for the sake of understanding them easily. In this second exemplary embodiment, the plurality of heat exchanger elements 12a, 12b, 12c, 12d and 12e are arranged side by side into a flat configuration in the exactly same manner as shown in FIG. 2A.

Heat exchanger elements 12a, 12b, 12c, 12d and 12e arranged side by side in this manner can prevent the low temperature of heat-exchanger intake airflow path 10 from influencing the adjoining ones of heat exchanger elements 12. This arrangement can therefore eliminate the need to provide the thermal insulating materials between heat exchanger elements 12, or the measures of avoiding the sequence of switching the passages of exhaust airflow 4 and intake airflow 7 in a positional order of heat exchanger elements 12.

Third Exemplary Embodiment

Figure 3A:
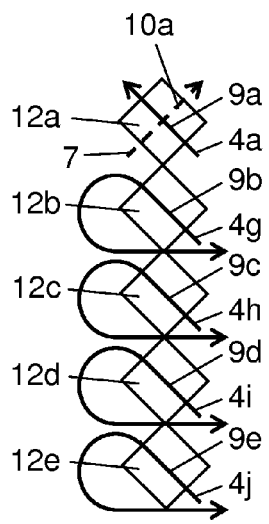
FIG. 3A is structural diagram showing a method of guiding exhaust airflow and intake airflow in a heat-exchanger type ventilation system according to a third exemplary embodiment of the present invention.
Figure 3B:
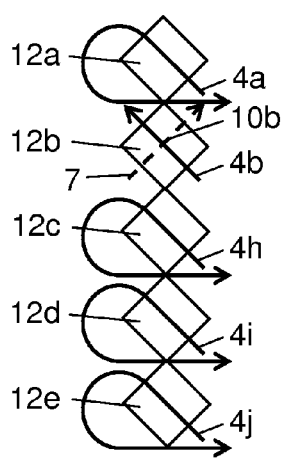
FIG. 3B is another structural diagram showing the method of guiding the exhaust airflow and the intake airflow in the heat-exchanger type ventilation system according to the third exemplary embodiment of the present invention.
Figure 3C:
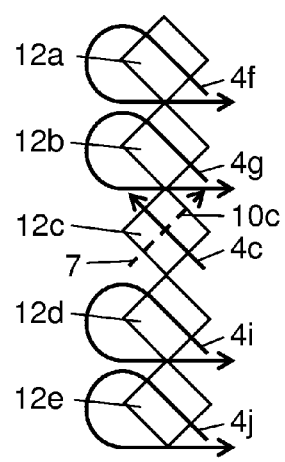
FIG. 3C is still another structural diagram showing the method of guiding the exhaust airflow and the intake airflow in the heat-exchanger type ventilation system according to the third exemplary embodiment of the present invention.

FIG. 3A, FIG. 3B and FIG. 3C are structural diagrams showing a method of guiding exhaust airflow and intake airflow in a heat-exchanger type ventilation system according to the third exemplary embodiment of the present invention. Heat exchanger element 12 of this exemplary embodiment has a structure of similar arrangement as that of the first exemplary embodiment. In this exemplary embodiment, heat exchanger element 12a is used at the beginning of operation to exchange heat between exhaust airflow 4a and intake airflow 7, as shown in FIG. 3A. During this period, other heat exchanger elements 12b, 12c, 12d and 12e not exchanging heat are assigned to pass only the room air through their respective heat-exchanger exhaust airflow paths 9b, 9c, 9d and 9e, and form indoor-air circulation flows 4g, 4h, 4i and 4j, which are returned back into the room again without allowing to pass through heat exchanger 11.

In the structure described above, indoor-air circulation flows 4g, 4h, 4i and 4j guided through heat-exchanger exhaust airflow paths 9b, 9c, 9d and 9e of heat exchanger elements 12b, 12c, 12d and 12e not exchanging the heat are brought back into the room instead of being exhausted to the outdoors, so that they complete the circulation of returning into the room with only a small loss of pressure due to an airflow resistance as they are not forced to further pass through heat exchanger 11. This structure can thus achieve nearly optimum balancing between the exhaust air and the intake air from and to the room only with exhaust airflow 4a and intake airflow 7 passing through heat exchanger element 12a in the heat exchanging operation. The structure can also reduce a loss of energy since it returns the energy born in the room air back into the room.

The above operation is then carried out with heat exchanger element 12b as shown in FIG. 3B when the mainly used heat exchanger element 12a begins to lose its efficiency. The operation is passed on next to heat exchanger element 12c as shown in FIG. 3C. The operation is switched in a sequential order in the above manner and in the same way as the first and the second exemplary embodiments.

According to the third exemplary embodiment of this invention, as discussed, the heat-exchanger type ventilation system can achieve a more comfortable living space in the cold climate.

Fourth Exemplary Embodiment

Figure 4A:
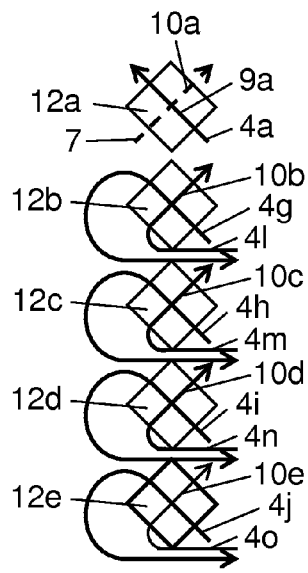
FIG. 4A is structural diagram showing a method of guiding exhaust airflow and intake airflow in a heat-exchanger type ventilation system according to a fourth exemplary embodiment of the present invention.
Figure 4B:
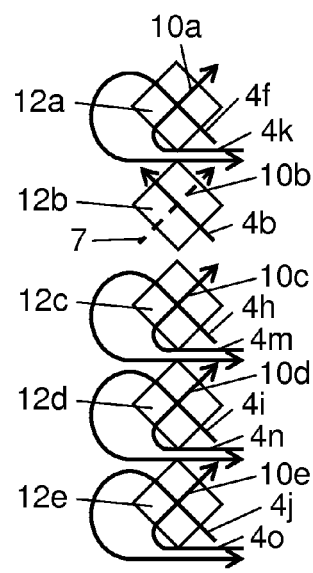
FIG. 4B is another structural diagram showing the method of guiding the exhaust airflow and the intake airflow in the heat-exchanger type ventilation system according to the fourth exemplary embodiment of the present invention.
Figure 4C:
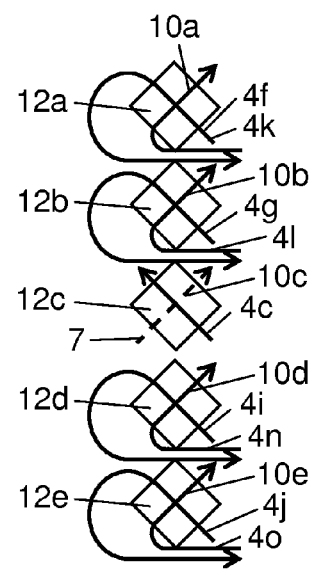
FIG. 4C is still another structural diagram showing the method of guiding the exhaust airflow and the intake airflow in the heat-exchanger type ventilation system according to the fourth exemplary embodiment of the present invention.

FIG. 4A, FIG. 4B and FIG. 4C are structural diagrams showing a method of guiding exhaust airflow and intake airflow in a heat-exchanger type ventilation system according to the fourth exemplary embodiment of the present invention. The fourth exemplary embodiment is to some extent similar to the third exemplary embodiment. At the beginning of operation, heat exchanger element 12a is used to exchange heat between exhaust airflow 4a and intake airflow 7, as shown in FIG. 4A. During this period, the room air is also guided to pass through heat-exchanger intake airflow path 10b, 10c, 10d and 10e inside of other heat exchanger elements 12b, 12c, 12d and 12e to form indoor-air circulation flows 4l, 4m, 4n and 4o respectively.

When the heat-exchanger type ventilation system of the above structure is operated, indoor-air circulation flows 4l, 4m, 4n and 4o also pass through heat-exchanger intake airflow paths 10b, 10c, 10d and 10e of heat exchanger elements 12b, 12c, 12d and 12e not contributing to the heat exchanging operation. As the operation is continued further and icing starts building up within heat exchanger element 12a, the passages of exhaust airflow 4a and intake airflow 7 are switched to the next heat exchanger element 12b. The ice built up in heat exchanger element 12a is then melted and dried thereafter by the warm indoor-air circulation flow 4f passing through heat-exchanger exhaust airflow path 9a as shown in FIG. 4B. During this period, the heat in warm indoor-air circulation flow 4k passing through heat-exchanger intake airflow path 10a is also conducted to heat-exchanger exhaust airflow path 9a to promote melting and drying of the ice and expedite the ice-coated heat exchanger element 12a to regain the normal condition.

The above operation is carried out with heat exchanger element 12c as shown in FIG. 4C when the mainly used heat exchanger element 12b starts losing its efficiency. The operation is switched in a sequential order in this manner and in the same way as the first through the third exemplary embodiments.

Fifth Exemplary Embodiment

Figure 5A:
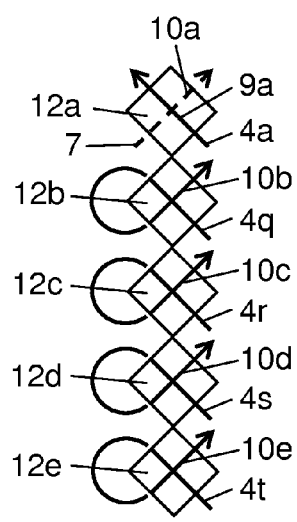
FIG. 5A is structural diagram showing a method of guiding exhaust airflow and intake airflow in a heat-exchanger type ventilation system according to a fifth exemplary embodiment of the present invention.
Figure 5B:
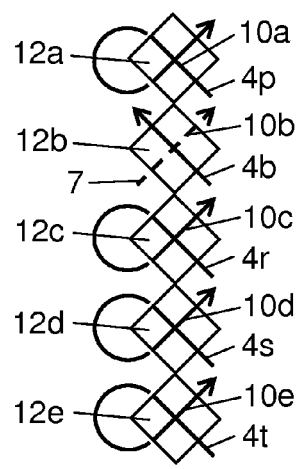
FIG. 5B is another structural diagram showing the method of guiding the exhaust airflow and the intake airflow in the heat-exchanger type ventilation system according to the fifth exemplary embodiment of the present invention.
Figure 5C:
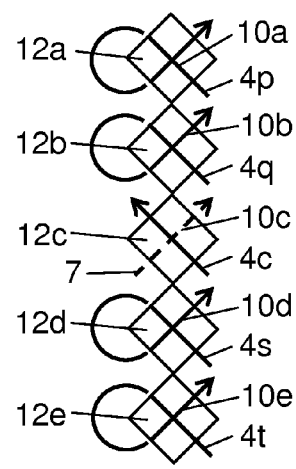
FIG. 5C is still another structural diagram showing the method of guiding the exhaust airflow and the intake airflow in the heat-exchanger type ventilation system according to the fifth exemplary embodiment of the present invention.

FIG. 5A, FIG. 5B and FIG. 5C are structural drawings showing a method of guiding exhaust airflow and intake airflow in a heat-exchanger type ventilation system according to the fifth exemplary embodiment of the present invention. The indoor air passing through heat-exchanger exhaust airflow path 9 by way of indoor-air circulation flows 4f, 4g, 4h, 4i and 4j as shown in FIG. 3A et al. in the third exemplary embodiment is further guided to flow through heat-exchanger intake airflow path 10 before being returned back to the room by forming indoor-air circulation flows 4p, 4q, 4r, 4s and 4t, as shown in FIG. 5A.

According to the above-described structure, indoor-air circulation flows 4p, 4q, 4r, 4s and 4t passing through both heat-exchanger exhaust airflow path 9 and heat-exchanger intake airflow path 10 of heat exchanger element 12 promote melting and drying of ice built up inside heat-exchanger exhaust airflow path 9 to help fasten the iced-coated heat exchanger element 12a to regain the normal condition in the same manner as the fourth exemplary embodiment. An advantage of this embodiment is that the above task and effect can be achieved only by streams of indoor-air circulation flows zip, 4q, 4r, 4s and 4t.

This exemplary embodiment also functions in such a manner that the airflow is switched to heat exchanger element 12b as shown in FIG. 5B when heat exchanger element 12a starts losing its efficiency. The airflow is then switched to heat exchanger element 12c as shown in FIG. 5C when heat exchanger element 12b starts losing its efficiency, and the operation is passed on to the next heat exchanger element in a sequential order. The switching sequence may be changed to every other element or the like order as described in the first exemplary embodiment.

Sixth Exemplary Embodiment

Figure 6:
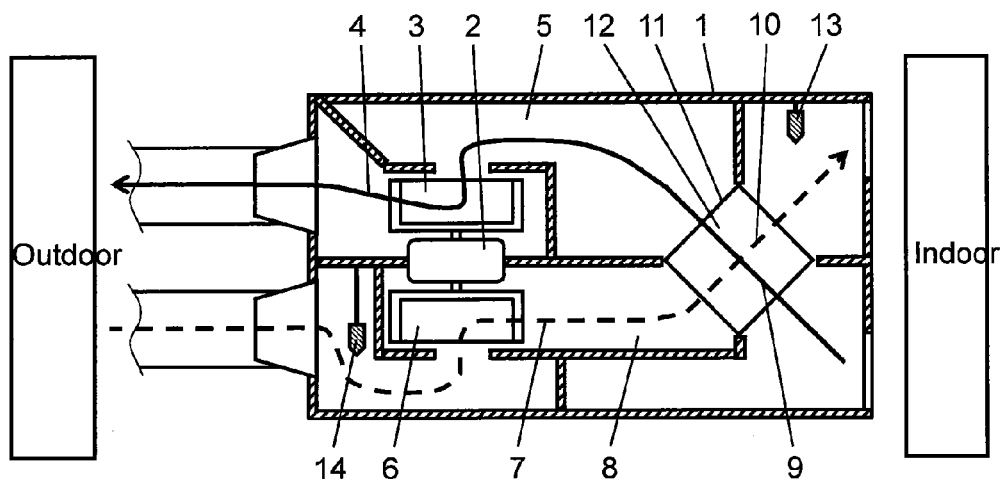
FIG. 6 is a sectional view showing a heat-exchanger type ventilation system according to a sixth exemplary embodiment of the present invention.

FIG. 6 is a sectional view showing a heat-exchanger type ventilation system according to the sixth exemplary embodiment of the present invention. Like reference marks are used to designate like structural components as those of the first exemplary embodiment. This ventilation system is provided with intake-air temperature detector 13 disposed at the downstream of heat-exchanger intake airflow path 10 in main body 1, and outdoor temperature detector 14 in the vicinity of an inlet port of intake airflow 7 of main body 1, as shown in FIG. 6.

Description is provided hereinafter of the heat-exchanger type ventilation system constructed as above when operated in winter in an area of cold climate. When the operation begins, intake-air temperature detector 13 detects a temperature of intake airflow 7 having passed through heat-exchanger intake airflow path 10 of heat exchanger 11, and outdoor temperature detector 14 detects an outdoor temperature. When the outdoor temperature decreases from a certain temperature to another temperature, a temperature of intake airflow 7 entering from the outdoor also decreases from a certain temperature to another temperature. Here, a value dF defining a temperature decrease of intake airflow 7 from a certain temperature to another temperature corresponding to a decrease value F of the outdoor temperature from a given temperature to another given temperature is obtained beforehand by an experiment, calculation, and the like method under the condition that heat exchanger element 12 functions normally. When a temperature of intake airflow 7 being drawn from the outdoor continues to remain so low as below 0° C., it gradually develops icing inside heat-exchanger exhaust airflow path 9 and lessens the heat exchanging efficiency. This decreases a transferring rate of the heat exchanged from exhaust airflow 4 to intake airflow 7, and lowers the temperature of intake air being detected by intake-air temperature detector 13 to an extent substantially exceeding the temperature decrease value dF given above. A part of the temperature decrease exceeding a normal decrease value is herein referred to as an excess temperature decrease value. Based on these data, this ventilation system is provided beforehand with a predetermined value D (° C.) as the excess temperature decrease value for intake airflow 7 likely to cause an icing condition leading to a problem in the heat exchanging function of heat exchanger 11.

While outdoor temperature detector 14 detects a decrease in the outdoor temperature, and when a temperature decrease detected by intake-air temperature detector 13 becomes equal to or greater than a predetermined value dF+D (° C.) derived by adding the excess temperature decrease value D (° C.), it is then considered that a problem arises in the heat exchanging function in one of heat exchanger elements 12, and passages of exhaust airflow 4 and intake airflow 7 are switched to another heat exchanger element 12 located adjacent to it.

According to the sixth exemplary embodiment, as discussed, the heat-exchanger type ventilation system has the function of detecting the ice formation in heat exchanger 11 by taking into account a decrease in the outdoor temperature, thereby preventing adverse influences of the icing with exactitude.

Seventh Exemplary Embodiment

Figure 7:
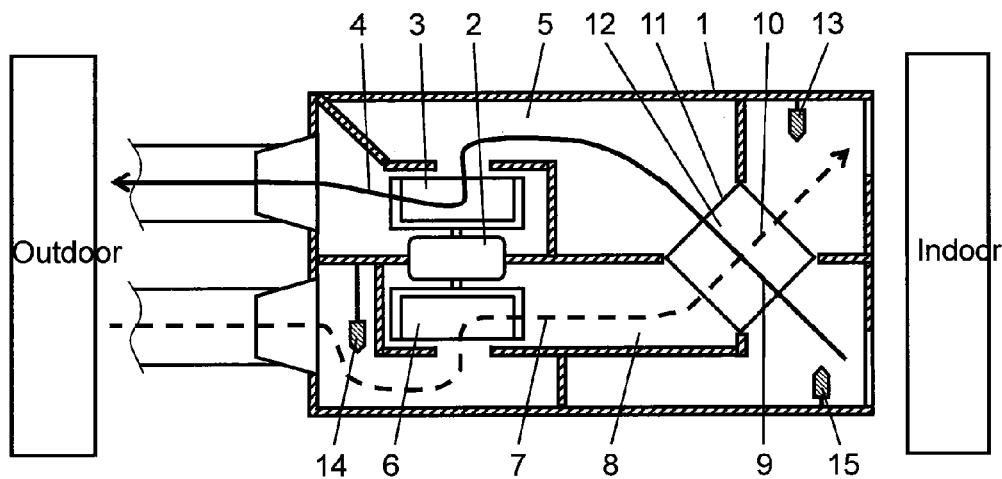
FIG. 7 is a sectional view showing a heat-exchanger type ventilation system according to a seventh exemplary embodiment of the present invention.

FIG. 7 is a sectional view showing a heat-exchanger type ventilation system according to the seventh exemplary embodiment of the present invention. Like reference marks are used to designate like structural components as those of the other exemplary embodiments. This ventilation system is provided with intake-air temperature detector 13 disposed at the downstream of heat-exchanger intake airflow path 10 of heat exchanger 11, outdoor temperature detector 14 in the vicinity of an inlet port of intake airflow 7, and indoor temperature detector 15 in the vicinity of an inlet port of exhaust airflow 4, all within main body 1 as shown in FIG. 7.

Description is provided hereinafter of the heat-exchanger type ventilation system constructed as above when operated in winter in an area of cold climate. When the operation begins, intake-air temperature detector 13 detects a temperature of intake airflow 7 having passed through heat-exchanger intake airflow path 10 of heat exchanger 11, outdoor temperature detector 14 detects an outdoor temperature, and indoor temperature detector 15 detects an indoor temperature. When the outdoor temperature decreases and the room temperature decreases due to adjustment of a temperature setting of room air-conditioner or some other reasons, a temperature of intake airflow 7 also decreases by the effect of both of these temperature changes. A value dF+dR defining a temperature decrease of intake airflow 7 from a certain temperature to another temperature corresponding to a decrease value F of the outdoor temperature from a given temperature to another given temperature and a decrease value R of the room temperature from a given temperature to another given temperature is obtained in advance by an experiment, calculation, and the like method. When a temperature of intake airflow 7 being drawn from the outdoor continues to remain so low as below 0° C., it gradually develops icing inside heat-exchanger exhaust airflow path 9 and lessens the heat exchanging efficiency. This decreases a transferring rate of the heat exchanged from exhaust airflow 4 to intake airflow 7, and significantly lowers the temperature of intake air being detected by intake-air temperature detector 13. Here, a part of the temperature decrease exceeding a normal decrease value is referred to as an excess temperature decrease value. Based on these data, this ventilation system is provided beforehand with a predetermined value D (° C.) as the excess temperature decrease value for intake airflow 7 likely to cause an icing condition leading to a problem in the heat exchanging function of heat exchanger 11.

Now, outdoor temperature detector 14 and indoor temperature detector 15 detect a decrease in the outdoor temperature and a decrease in the room temperature respectively. When intake-air temperature detector 13 detects a temperature decrease of a value greater than a temperature decrease value dF+dR derived from the detected decreases of the outdoor temperature and the room temperature by at least the predetermined value D (° C.), it is then considered that a problem arises in exhaust airflow 4, and passages of exhaust airflow 4 and intake airflow 7 are therefore switched to the next one of heat exchanger elements 12.

According to the seventh exemplary embodiment, as discussed above, the heat-exchanger type ventilation system has the function of detecting the ice built up in heat exchanger 11 by taking into account a decrease in the room temperature as well as a decrease in the outdoor temperature, thereby preventing adverse influences of the icing with exactitude.

Eighth Exemplary Embodiment

Figure 8:
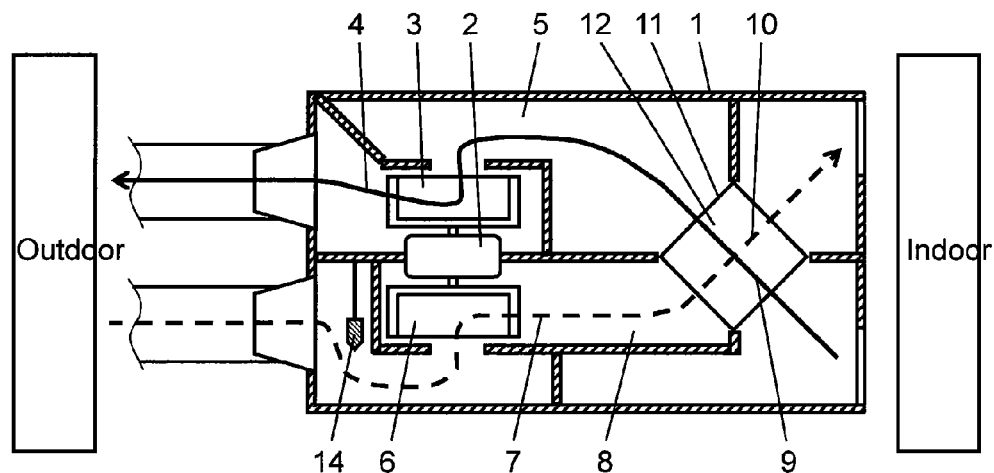
FIG. 8 is a sectional view showing a heat-exchanger type ventilation system according to an eighth exemplary embodiment of the present invention.

FIG. 8 is a sectional view showing a heat-exchanger type ventilation system according to the eighth exemplary embodiment of the present invention. Like reference marks are used to designate like structural components as those of the other exemplary embodiments. As shown in FIG. 8, this ventilation system is provided with outdoor temperature detector 14 disposed in the vicinity of an inlet port of intake airflow 7 in main body 1, and an operation controller (not shown) for allowing the ventilation system to operate continuously for a certain period of time determined according to an outdoor temperature detected by outdoor temperature detector 14 under a condition as it stands. This ventilation system also has a plurality of heat exchanger elements 12 stacked next to each other in the same configuration as those of the first, second and the other exemplary embodiments.

A relation between outdoor temperatures and predetermined periods of operating time of the heat-exchanger type ventilation system under such temperatures and conditions is obtained and set in advance by an experiment, calculation, and the like method based on the outdoor temperatures. While drawing intake airflow 7 of a cold temperature from the outdoor to heat exchanger 11 particularly in winter season, determination is made to establish a time for any of heat exchanger elements 12 to start developing an icing condition that leads to a problem in the heat exchanging function under that temperature of intake airflow 7. The time obtained in this condition is denoted as predetermined time T in minutes of a continuously operable duration.

When the heat-exchanger type ventilation system of the above structure is operated, it detects an outdoor temperature by outdoor temperature detector 14, and continues the operation for a predetermined time T corresponding to the detected temperature under the same condition at the time, i.e., exhaust airflow 4 and intake airflow 7 are continued to pass through the same one of heat exchanger elements 12 that has been supplied with exhaust airflow 4 and intake airflow 7 at the time of the temperature detection. The passages of exhaust airflow 4 and intake airflow 7 are then switched to another heat exchanger element 12 provided adjoining to it upon a lapse of the predetermined time T.

The same process as above is then repeated to detect the outdoor temperature for the switched one of heat exchanger elements 12 and the operation is continued for another predetermined time T corresponding to the detected outdoor temperature. The passages are again switched to another heat exchanger element 12 and the process is repeated thereafter in the same manner for individual heat exchanger elements 12 in the sequential order.

According to the eighth exemplary embodiment of this invention, as discussed above, the heat-exchanger type ventilation system can prevent adverse influences of icing in heat exchanger 11 by a simple structure for detecting the outdoor temperature and presetting a continuously operable duration corresponding to the detected temperature.

In a situation where the outdoor temperature is not likely to cause icing inside heat exchanger 11, the system is not required to set any limitation of time for the continuous operation.

Ninth Exemplary Embodiment

Figure 9:
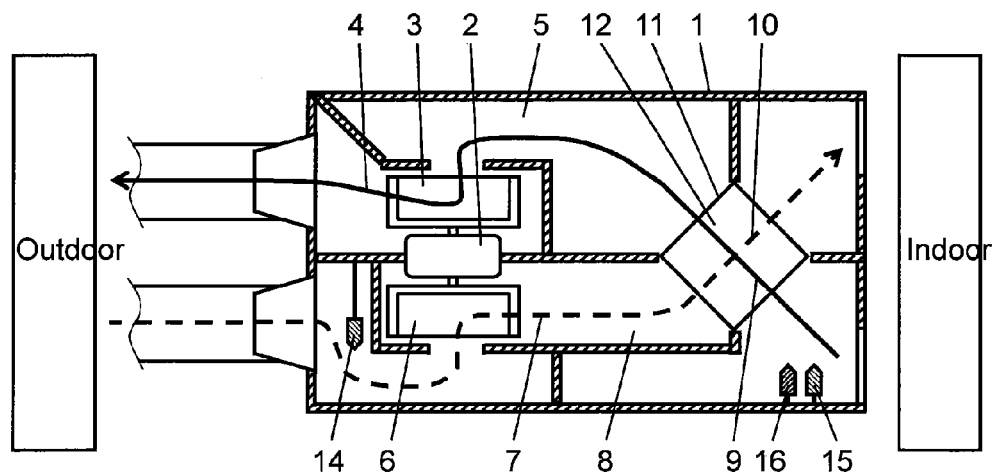
FIG. 9 is a sectional view showing a heat-exchanger type ventilation system according to a ninth exemplary embodiment of the present invention.

FIG. 9 is a sectional view showing a heat-exchanger type ventilation system according to the ninth exemplary embodiment of the present invention. Like reference marks are used to designate like structural components as those of the other exemplary embodiments. The heat-exchanger type ventilation system of this exemplary embodiment is provided with outdoor temperature detector 14 disposed in the vicinity of an inlet port of intake airflow 7 in main body 1, indoor temperature detector 15 and indoor humidity detector 16 disposed in the vicinity of an inlet port of exhaust airflow 4 in main body 1, as shown in FIG. 9. There is a correlation between three factors of outdoor temperature, indoor temperature and indoor humidity and dew condensation. Accordingly, a time required for ice to build up and cause a problem in the heat exchanging function from the start of detection is obtained in advance by an experiment, calculation, and the like method based on a combination of these three factors, a degree of ease/difficulty of dew condensation and a time for dew condensations to start icing, and the data is stored in an operation controller (not shown) as predetermined operating time U in minutes. This ventilation system also has a plurality of heat exchanger elements 12 stacked next to each other in the same configuration as those of the first, second and the other exemplary embodiments.

When the heat-exchanger type ventilation system of the above structure is operated especially in winter season in a cold district, it detects an outdoor temperature with outdoor temperature detector 14, an indoor temperature with indoor temperature detector 15 and an indoor humidity with indoor humidity detector 16, and calculates a value of predetermined operating time U in minutes corresponding to a combination of these three detected values. The operation is then continued for the predetermined time under the same condition at the time, i.e., exhaust airflow 4 and intake airflow 7 are continued to pass through the one of heat exchanger elements 12 that has been supplied with exhaust airflow 4 and intake airflow 7 at the time of the temperature and humidity detection. The passages of exhaust airflow 4 and intake airflow 7 are then switched to another heat exchanger element 12 provided adjoining to it upon a lapse of the predetermined operating time U.

The same process as above is then repeated to detect the outdoor temperature, indoor temperature and indoor humidity for the switched one of heat exchanger elements 12 and the operation is continued for another predetermined operating time U corresponding to these detected values. The passages are again switched to another heat exchanger element 12 and the process is repeated thereafter in the same manner for individual heat exchanger elements 12 in the sequential order.

According to the ninth exemplary embodiment of this invention, as discussed above, the heat-exchanger type ventilation system has the function of preventing adverse influences of the icing inside heat exchanger 11 based on outdoor and indoor situations (i.e., the temperatures and humidity), and it can hence ensure the heat exchanging and ventilating operation in any cold climate.

The ventilation system is provided with a table registering a plurality of predetermined operating times U in minutes corresponding to a number of combinations of the three factors obtained according to anticipatable variations of the outdoor and indoor conditions, and stores it in the operation controller (not shown), so that heat exchanger element 12 through which exhaust airflow 4 and intake airflow 7 are directed is switched based on the data in this table. This ventilation system is hence capable of controlling the heat exchanging and ventilating operation accurately while preventing adverse influences of the ice formation.

In a situation where the outdoor and indoor conditions are not likely to cause icing inside heat exchanger 11, the system is not required to set any limitation of time for the continuous operation in view of the icing.

Tenth Exemplary Embodiment

Figure 10:
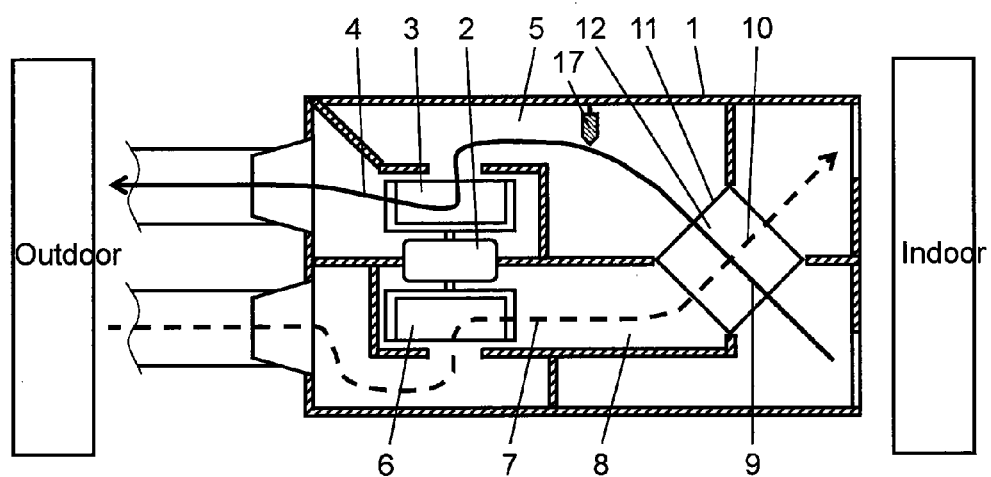
FIG. 10 is a sectional view showing a heat-exchanger type ventilation system according to a tenth exemplary embodiment of the present invention.

FIG. 10 is a sectional view showing a heat-exchanger type ventilation system according to the tenth exemplary embodiment of the present invention. Like reference marks are used to designate like structural components as those of the other exemplary embodiments. This exemplary embodiment has a structure comprising exhaust-air temperature detector 17 at the downstream of heat-exchanger exhaust airflow path 9 of heat exchanger 11 inside main body 1 as shown in FIG. 10. This ventilation system is also provided with a plurality of heat exchanger elements 12 stacked next to each other in the same configuration as those of the first and the other exemplary embodiments.

Heat exchanger 11 starts building up ice inside heat-exchanger exhaust airflow path 9 when the heat-exchanger type ventilation system is operated in winter season in a cold district, as discussed above in the first exemplary embodiment. A temperature of exhaust airflow 4 passing through heat-exchanger exhaust airflow path 9 gradually decreases with increase in building up of the ice. Accordingly, this ventilation system is preset with an icing temperature G (° C.) of the exhaust airflow, which is obtained in advance by an experiment, calculation, and the like method as a temperature of exhaust airflow 4 after having passed through heat-exchanger exhaust airflow path 9 of a state in which built up of ice has a potential of leading to a problem in the heat exchanging function.

The heat-exchanger type ventilation system of the above structure detects a temperature of exhaust airflow 4 after it has passed through heat-exchanger exhaust airflow path 9 during operation, and switches the passages of exhaust airflow 4 and intake airflow 7 to another heat exchanger element 12 provided adjoining to it when the detected temperature becomes equal to or below the predetermined icing temperature G (° C.).

According to the tenth exemplary embodiment, as discussed above, the heat-exchanger type ventilation system has the function of preventing adverse influences of the icing by detecting the temperature of exhaust airflow 4 after having passed through heat-exchanger exhaust airflow path 9 where icing is likely to develop. The ventilation system can thus achieve prevention of the icing problem with exactitude since it directly detects the icing condition leading to a problem.

Eleventh Exemplary Embodiment

Figure 11:
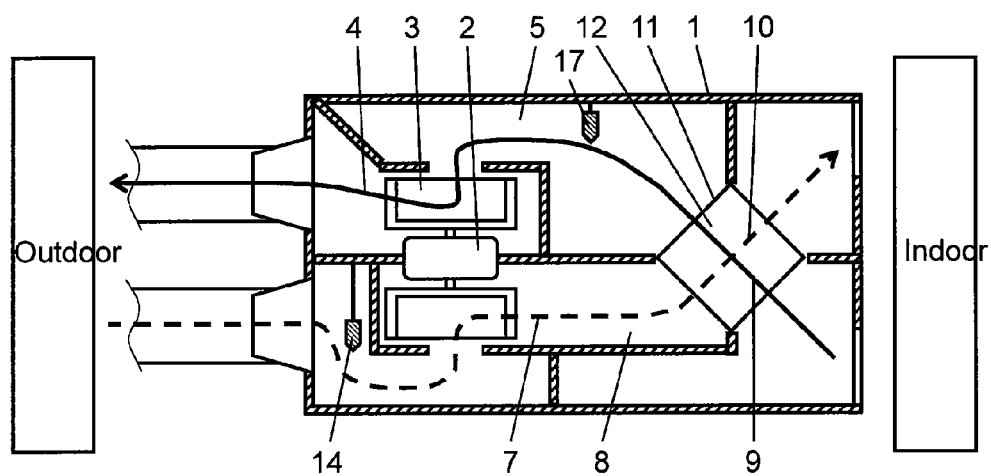
FIG. 11 is a sectional view showing a heat-exchanger type ventilation system according to an eleventh exemplary embodiment of the present invention.

FIG. 11 is a sectional view showing a heat-exchanger type ventilation system according to the eleventh exemplary embodiment of the present invention. Like reference marks are used to designate like structural components as those of the other exemplary embodiments. As shown in FIG. 11, this eleventh exemplary embodiment has a structure comprising outdoor temperature detector 14 disposed in the vicinity of an inlet port of intake airflow 7 in main body 1, in addition to the structure of the tenth exemplary embodiment shown in FIG. 10.

When the outdoor temperature decreases and a temperature of intake airflow 7 entering from the outdoor decreases, a temperature of exhaust airflow 4 exchanging heat with intake airflow 7 inside heat exchanger 11 also decreases with the temperature decrease of intake airflow 7. A decrease value in the temperature of exhaust airflow 4 corresponding to a decrease value of the outdoor temperature is obtained in advance by an experiment, calculation, and the like method, and it is denoted as temperature decrease dH (° C.) attributed to the outdoor temperature H (° C.). When a temperature of intake airflow 7 being drawn from the outdoor continues to remain so low as below 0° C., it gradually develops icing inside heat-exchanger exhaust airflow path 9, and results in a significant decrease of an extent larger than the above value of temperature decrease dH (° C.) of the exhaust air detected by exhaust-air temperature detector 17. This ventilation system is therefore preset beforehand with a predetermined value E (° C.) as the temperature decrease value of exhaust airflow 4 likely to cause an icing condition leading to a problem in the heat exchanging function of heat exchanger 11.

While outdoor temperature detector 14 detects a decrease in the outdoor temperature and when exhaust-air temperature detector 17 detects a temperature decrease of a value (dH+E) (° C.) larger than the temperature decrease value dH (° C.) derived from the detected decreases of the outdoor temperature by at least the predetermined value E (° C.), it is then considered that a problem arises in exhaust airflow 4 due to icing, and passages of exhaust airflow 4 and intake airflow 7 are switched to the next one of heat exchanger elements 12.

According to the eleventh exemplary embodiment, as discussed above, the heat-exchanger type ventilation system has the function of detecting the icing of heat exchanger 11 by taking into account a decrease in the outdoor temperature, in addition to the task and advantageous effect of the tenth exemplary embodiment, thereby preventing adverse influences of the ice formation more effectively with exactitude.

Twelfth Exemplary Embodiment

Figure 12:
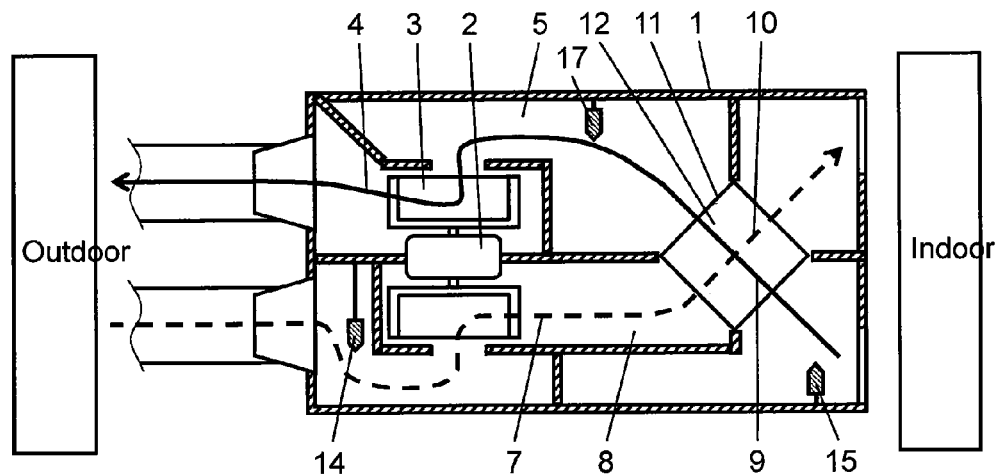
FIG. 12 is a sectional view showing a heat-exchanger type ventilation system according to a twelfth exemplary embodiment of the present invention.

FIG. 12 is a sectional view showing a heat-exchanger type ventilation system according to the twelfth exemplary embodiment of the present invention. Like reference marks are used to designate like structural components as those of the other exemplary embodiments. As shown in FIG. 12, this twelfth exemplary embodiment has a structure comprising indoor temperature detector 15 disposed in the vicinity of an inlet port of exhaust airflow 4 in main body 1, in addition to the structure of the eleventh exemplary embodiment shown in FIG. 11.

When the outdoor temperature decreases, a temperature of exhaust airflow 4 passing through heat exchanger 11 also decreases, as discussed above in the eleventh exemplary embodiment. If the room temperature also decreases due to adjustment of a temperature setting of room air-conditioner or some other reasons, the temperature of exhaust airflow 4 further decreases due to the effect of the decrease of this temperature. Accordingly, a decrease value in the temperature of exhaust airflow 4 corresponding to a decrease value H of the outdoor temperature and a decrease value R of the indoor temperature is obtained in advance by an experiment, calculation, and the like method. This decrease value in the temperature of the exhaust airflow attributed to the decreases the outdoor temperature and the indoor temperature is denoted as dI (° C.).

Now, outdoor temperature detector 14 and indoor temperature detector 15 detect a decrease in the outdoor temperature and a decrease in the indoor temperature respectively. When exhaust-air temperature detector 17 detects a temperature decrease of a value (dI+E) (° C.) larger than the temperature decrease value dI derived from the decreases of the outdoor temperature and the room temperature by at least the predetermined value E (° C.) described in the above eleventh exemplary embodiment, it is then considered that a problem arises in exhaust airflow 4, and passages of exhaust airflow 4 and intake airflow 7 are switched to the next one of heat exchanger elements 12.

According to the twelfth exemplary embodiment, as discussed above, this heat-exchanger type ventilation system has the function of detecting ice formation in heat exchanger 11 by taking into account the decrease in the indoor temperature in addition to the decrease in the outdoor temperature of the eleventh exemplary embodiment, thereby preventing adverse influences of the ice formation more effectively with exactitude.

Thirteenth Exemplary Embodiment

Figure 13:
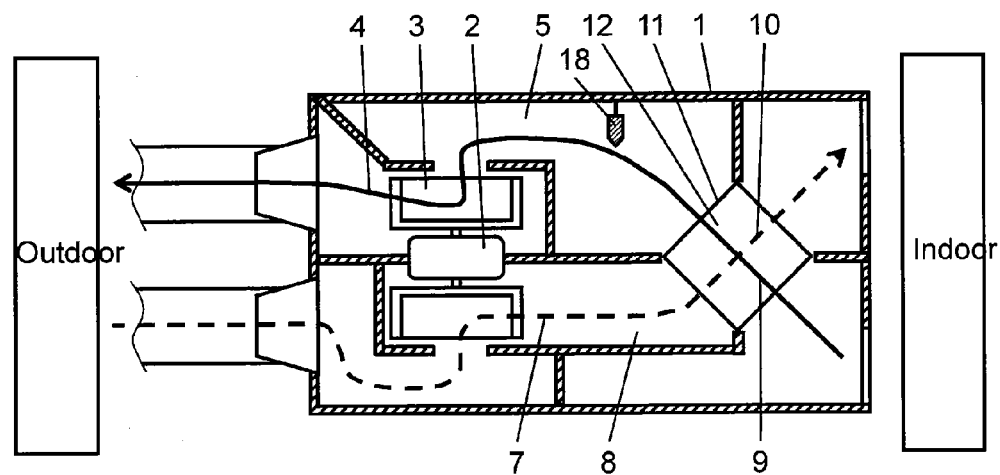
FIG. 13 is a sectional view showing a heat-exchanger type ventilation system according to a thirteenth exemplary embodiment of the present invention.

FIG. 13 is a sectional view showing a heat-exchanger type ventilation system according to the thirteenth exemplary embodiment of the present invention. Like reference marks are used to designate like structural components as those of the other exemplary embodiments. As shown in FIG. 13, this exemplary embodiment has a structure comprising air velocity detector 18 disposed at the downstream of heat-exchanger exhaust airflow path 9 of heat exchanger 11 inside main body 1, the air velocity detector 18 serves as an exhaust airflow detector for detecting a condition of exhaust airflow 4.

When the heat-exchanger type ventilation system of the above structure starts operating, a velocity of exhaust airflow 4 is detected by air velocity detector 18. The air velocity detected at this very moment represents a value when exhaust airflow 4 moves normally through heat-exchanger exhaust airflow path 9 since it is not under the influenced of cold temperatures of intake airflow 7 inside heat-exchanger exhaust airflow path 9.

When the operation is continued in winter season in a cold climate, in particular, ice starts building up gradually in heat-exchanger exhaust airflow path 9 due to an influence of low temperatures of intake airflow 7, and the ice impedes movement of exhaust airflow 4. If air velocity detector 18 detects the velocity of a value smaller than the velocity detected at the start of the operation by at least a predetermined velocity difference V (m/sec), it is considered that a problem arises in exhaust airflow 4 due to icing, and passages of exhaust airflow 4 and intake airflow 7 are switched to the next one of heat exchanger elements 12. Here, the predetermined velocity difference V (m/sec) referred to a decrease value of the velocity set in advance according to an icing condition likely to raise a problem in the heat exchanging function of heat exchanger 11 as obtained by an experiment, calculation, and the like method.

According to the thirteenth exemplary embodiment of this invention, as discussed, the heat-exchanger type ventilation system has the function of detecting the velocity of exhaust airflow 4 directly and determining an icing condition inside heat exchanger 11 responsively with a simple structure, and it can hence prevent adverse influences resulting from the ice formation.

Fourteenth Exemplary Embodiment

Figure 14:
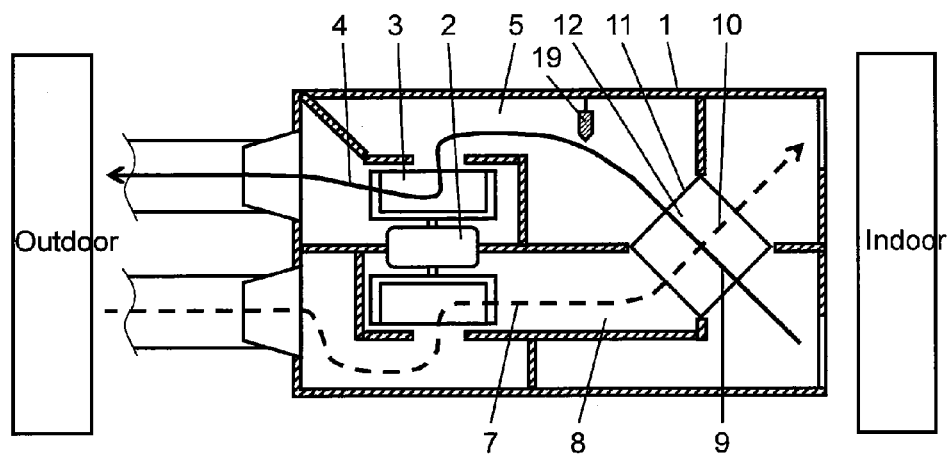
FIG. 14 is a sectional view showing a heat-exchanger type ventilation system according to a fourteenth exemplary embodiment of the present invention.
Figure 15:
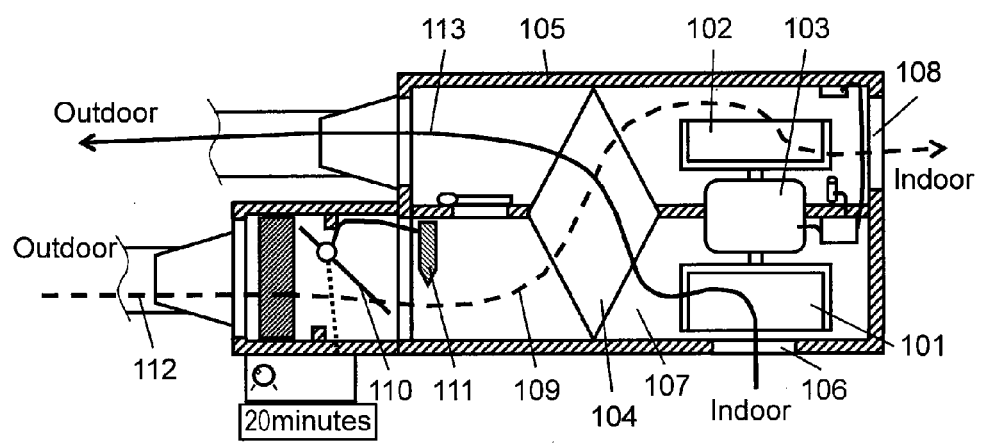
FIG. 15 is a sectional view of a conventional heat-exchanger type ventilation system showing a state of heat exchanging operation.
Figure 16:
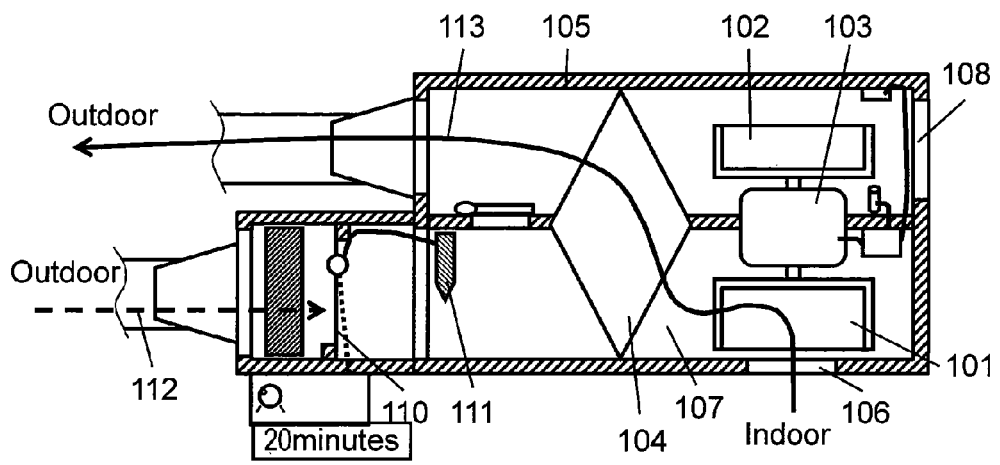
FIG. 16 is a sectional view of the same conventional heat-exchanger type ventilation system showing another mode of operation when intake airflow is blocked.
Figure 17:
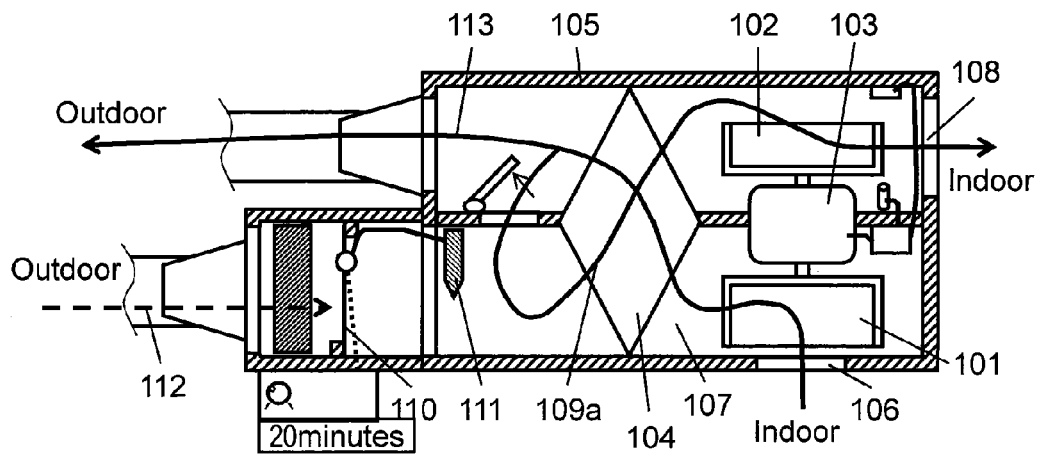
FIG. 17 is a sectional view of the same conventional heat-exchanger type ventilation system showing still another mode of operation, in which a part of exhaust air is circulated while the intake airflow is being blocked.

FIG. 14 is a sectional view showing a heat-exchanger type ventilation system according to the fourteenth exemplary embodiment of the present invention. Like reference marks are used to designate like structural components as those of the other exemplary embodiments. As shown in FIG. 14, this fourteenth exemplary embodiment has a structure comprising static pressure detector 19 for detecting a static pressure in exhaust airflow path 5 at the downstream of heat-exchanger exhaust airflow path 9 of heat exchanger 11, the static pressure detector 19 serves as an exhaust airflow detector. When exhaust airflow 4 is impeded by formation of ice, the static pressure also decreases. If the static pressure becomes smaller in value than that detected at the beginning of the operation by at least a predetermined value, it is considered that a problem arises in exhaust airflow 4 due to ice formation, and passages of exhaust airflow 4 and intake airflow 7 are switched to the next one of heat exchanger elements 12.

There is a case that exhaust airflow 4 exited immediately after passing through heat-exchanger exhaust airflow path 9 shows an irregularity in its distribution depending on unevenness of the ice formation when observed in a direction orthogonal to the direction of airflow in exhaust airflow path 5. A possibility thus arises in the system of determining the icing condition by detecting a difference of the velocity like the one in the thirteenth exemplary embodiment, in which a temporal delay occurs before detecting the ice formation when the ice is not formed evenly. The fourteenth exemplary embodiment can detect influences of the icing inside the heat-exchanger exhaust airflow path 9 comprehensively by detecting the static pressure in exhaust airflow path 5, thereby achieving prevention of the icing problem more effectively with exactitude.

In the present invention, although the exemplary embodiments illustrate structures having intake airflow 7 guided through only one of heat exchanger elements 12 and switching the passage of intake airflow 7 to the next one of heat exchanger elements 12 in a sequential order, these structures presented herein should be considered as illustrative and not restrictive such that the passage of intake airflow 7 needs not be limited to only one heat exchanger element 12 at a time. The structures may instead be formed so that intake airflow 7 is guided to a plurality of selected heat exchanger elements 12 simultaneously. In other words, intake airflow 7 may be guided to a plurality of selected heat exchanger elements 12 first, and the passage of intake airflow 7 is switched sequentially to the next plurality of heat exchanger elements 12 not having passed intake airflow 7 previously when their heat exchanging efficiency begins declining.

As discussed above, the present invention is so constructed as to switch the heat exchanger element according to any of predetermined conditions. The predetermined conditions include several predetermined temperature conditions used as switching timings such as icing temperature F, icing temperature G, predetermined value dF+D (° C.) of temperature decrease having excess temperature decrease value D (° C.) added thereto, temperature decrease dF+dR+D (° C.), temperature decrease dI+E (° C.) larger than predetermined value E (° C.), and temperature decrease dH+E (° C.) larger than temperature decrease dH (° C.) by at least E (° C.). Other predetermined conditions useful as the bases of switching timing include predetermined time T in minutes as a time condition, predetermined velocity difference V (m/sec) as an air velocity condition and predetermined static pressure as a pressure condition.

INDUSTRIAL APPLICABILITY

The heat-exchanger type ventilation system of the present invention is capable of executing the fundamental heat exchanging function and ventilating operation continuously even when the outdoor temperature is extremely low, and it is therefore useful as a ventilation unit for ventilating air while exchanging heat in winter season in an area of cold climate.

The invention claimed is:

1. A heat-exchanger type ventilation system comprising:
a heat exchanger for allowing exhaust airflow to move from inside a room to outdoors and intake airflow to move from the outdoors to the room, and exchanging heat between the exhaust airflow and the intake airflow; and
a temperature detector positioned to detect a temperature of the intake air flow after the intake airflow passes through the heat exchanger,
wherein the heat exchanger includes a plurality of heat exchanger elements stacked in an overlapping direction with a thermal insulation material placed between adjacent ones of the plurality of heat exchanger elements to integrally form the heat exchanger, the plurality of heat exchanger elements comprises a first and second heat exchanger element and each of the first and second heat exchanger elements has, respectively, a heat-exchanger exhaust airflow path and a heat-exchanger intake airflow path formed therein for allowing the exhaust airflow and the intake airflow to pass therethrough;
the exhaust airflow passes through the first and second heat exchanger elements;
the intake airflow passes through one of the first and second heat exchanger elements which is selected for exchanging the heat, and the first or second heat exchanger element which is not selected is not used for exchanging the heat;
the intake airflow is changed from passing through the first heat exchanger element to passing through the second heat exchanger element, in a sequential manner according to a predetermined condition set thereto when the temperature detector detects a preset icing temperature; and wherein the icing temperature is a preliminarily designated temperature which is defined as a temperature where the ventilation system is likely to have a problem in the heat exchanging function of the heat exchanger.

2. The heat-exchanger type ventilation system of claim 1, wherein only the exhaust airflow is guided to pass through the first or second heat exchanger element not being used for exchanging the heat between the exhaust airflow and the intake airflow.

3. The heat-exchanger type ventilation system of claim 1, wherein air of the room is guided to pass through the heat-exchanger exhaust airflow path of the first or second heat exchanger element not being used for exchanging the heat between the exhaust airflow and the intake airflow, and the air is returned back into the room without allowing to pass through the heat exchanger element.

4. The heat-exchanger type ventilation system of claim 1, wherein air of the room is guided to pass through the heat-exchanger exhaust airflow path of the first or second heat exchanger element not being used for exchanging the heat between the exhaust airflow and the intake airflow and returned back into the room, wherein the air of the room is sent back into the room by guiding it to pass through the heat-exchanger intake airflow path of the first or second heat exchanger element not being used for exchanging the heat between the exhaust airflow and the intake airflow.

5. The heat-exchanger type ventilation system of claim 1, wherein the heat-exchanger type ventilation system forms an indoor-air circulation where air of the room is guided to pass through the heat-exchanger exhaust airflow path of the first or second heat exchanger element not being used for exchanging the heat between the exhaust airflow and the intake airflow, and returned back into the room.

6. The heat-exchanger type ventilation system of claim 1 further comprising:

an intake-air temperature detector disposed downstream of the heat-exchanger intake airflow path, wherein the passages of the exhaust airflow and the intake airflow are switched to the first or second heat exchanger element not being used for exchanging the heat between the exhaust airflow and the intake airflow when the intake-air temperature detector detects an icing temperature during operation.

7. The heat-exchanger type ventilation system of claim 1 further comprising:

an intake-air temperature detector disposed at the downstream of the heat-exchanger intake airflow path; and
an outdoor temperature detector for detecting an outdoor temperature, wherein the passages of the airflow are switched to the first or second heat exchanger element not being used for exchanging the heat between the exhaust airflow and the intake airflow when a temperature decrease detected by the intake-air temperature detector is larger than a temperature decrease detected by the outdoor temperature detector by at least a predetermined value.

8. The heat-exchanger type ventilation system of claim 1 further comprising:

an intake-air temperature detector disposed at the downstream of the heat-exchanger intake airflow path;
an outdoor temperature detector for detecting an outdoor temperature; and
an indoor temperature detector for detecting an indoor temperature, wherein the passages of the airflow are switched to the first or second heat exchanger element not being used for exchanging the heat between the exhaust airflow and the intake airflow when a temperature decrease detected by the intake-air temperature detector is larger than a decrease value of intake air temperature derived from a combination of a temperature decrease detected by the outdoor temperature detector and another temperature decrease detected by the indoor temperature detector by at least a predetermined value.

9. The heat-exchanger type ventilation system of claim 1 further comprising:

an outdoor temperature detector for detecting an outdoor temperature, wherein a heat exchanging operation is continued by passing the exhaust airflow and the intake airflow through one of the first and second heat exchanger element for a predetermined time set based on the outdoor temperature detected by the outdoor temperature detector, and the passages of the airflow are switched to the other of the first and second heat exchanger element not being used for exchanging the heat between the exhaust airflow and the intake airflow upon a lapse of the predetermined time.

10. The heat-exchanger type ventilation system of claim 1 further comprising:

an outdoor temperature detector for detecting an outdoor temperature;
an indoor temperature detector for detecting indoor temperature; and
an indoor humidity detector for detecting indoor humidity, wherein a heat exchanging operation is continued by having the exhaust airflow and the intake airflow pass through one of the first and second heat exchanger element for a predetermined time derived from a combination of a temperature detected by the outdoor temperature detector, a temperature detected by the indoor temperature detector and a humidity of a room detected by the indoor humidity detector, and the passages of the airflow are switched to the other of the first and second heat exchanger element not being used for exchanging the heat between the exhaust airflow and the intake airflow upon a lapse of the predetermined time.

11. The heat-exchanger type ventilation system of claim 10, wherein a table is prepared and stored in advance in the heat-exchanger type ventilation system, the table registering an operating time corresponding to a combination of the outdoor temperature, the indoor temperature and humidity, wherein the one of the first and second heat exchanger element for having the exhaust airflow and the intake airflow pass through is switched according to the table.

12. The heat-exchanger type ventilation system of claim 1 further comprising:

an exhaust-air temperature detector at the downstream of the heat-exchanger exhaust airflow path, wherein the passages of airflow are switched to the first or second heat exchanger element not being used for exchanging the heat between the exhaust airflow and the intake airflow when the exhaust-air temperature detector detects a predetermined temperature during operation.

13. The heat-exchanger type ventilation system of claim 1 further comprising:

an exhaust-air temperature detector disposed at the downstream of the heat-exchanger exhaust airflow path; and an outdoor temperature detector for detecting an outdoor temperature, wherein the passages of airflow are switched to the first or second heat exchanger element not being used for exchanging the heat between the exhaust airflow and the intake airflow when a temperature decrease detected by the exhaust-air temperature detector is larger than a temperature decrease detected by the outdoor temperature detector by at least a predetermined value.

14. The heat-exchanger type ventilation system of claim 1 further comprising:

an exhaust-air temperature detector disposed at the downstream of the heat-exchanger exhaust airflow path;

an outdoor temperature detector for detecting an outdoor temperature; and an indoor temperature detector for detecting an indoor temperature, wherein the passages of airflow are switched to the first or second heat exchanger element not being used for exchanging the heat between the exhaust airflow and the intake airflow when a temperature decrease detected by the exhaust-air temperature detector is larger than a temperature decrease of exhaust air derived from both of a decrease of the outdoor temperature and a decrease of the indoor temperature by at least a predetermined value.

15. The heat-exchanger type ventilation system of claim 1 further comprising:

an exhaust airflow detector for detecting a condition of the exhaust airflow at the downstream of the heat-exchanger exhaust airflow path, wherein the passages of airflow are switched to the first or second heat exchanger element not being used for exchanging the heat between the exhaust airflow and the intake airflow when the exhaust airflow detector detects a predetermined amount of change in the condition of the exhaust airflow during operation as compared to another condition of the exhaust airflow detected at the start of the operation.

16. The heat-exchanger type ventilation system of claim 15, wherein the exhaust airflow detector includes an air velocity detector for detecting a velocity of the exhaust airflow.

17. The heat-exchanger type ventilation system of claim 15, wherein the exhaust airflow detector includes a static pressure detector for detecting a static pressure of the exhaust airflow.

18. The heat-exchanger type ventilation system of claim 1, wherein the passages of airflow are switched from the first or second heat exchanger element having been exchanging the heat between the exhaust airflow and the intake airflow to the first or second heat exchanger element not being used for exchanging the heat.

19. The heat-exchanger type ventilation system of claim 1, wherein the first and second heat exchanger elements are arranged side by side into a flat configuration.

20. A method of moving airflow using a heat-exchanger type ventilation system, the ventilation system comprising:

a heat exchanger for allowing exhaust airflow to move from inside a room to outdoors and intake airflow to move from the outdoors to the room, and exchanging heat between the exhaust airflow and the intake airflow: and a temperature detector positioned to detect a temperature of the intake air flow after the intake airflow passes through the heat exchanger, and said method comprising the steps of:

passing the exhaust airflow through first and second heat exchanger elements stacked in an overlapping direction with a thermal insulation material placed between the first and second heat exchanger elements;

passing the intake airflow through one of the first and second heat exchanger elements which is selected for exchanging heat between the exhaust airflow and the intake airflow, and the first or second heat exchanger element which is not selected is not used for exchanging heat; and changing the intake airflow from passing through the first heat exchanger element to passing through the second heat exchanger element, wherein the changing step is performed when the temperature detector detects a preset icing temperature; and wherein the icing temperature is a preliminarily designated temperature which is defined as a temperature where the ventilation system is likely to have a problem in the heat exchanging function of the heat exchanger.

* * * * *